United States Patent Office 2,698,317
Patented Dec. 28, 1954

2,698,317

PROCESS FOR PREPARING POLYSULFONE RESINS

Stanley E. Ross, Clifton, N. J., and Herman D. Noether, Kew Gardens, N. Y., assignors to Celanese Corporation of America, New York, N. Y., a corporation of Delaware No Drawing. Application October 10, 1951,
Serial No. 250,806

8 Claims. (Cl. 260—79.3)

This invention relates to the production of polymers and relates more particularly to the production of polymeric sulfones by the copolymerization with sulfur dioxide of olefinic compounds and compounds containing olefinic unsaturation.

An object of this invention is the provision of an improved process for the production of polymeric sulfones by the reaction of sulfur dioxide with olefinic compounds.

Another object of this invention is the production of polysulfone copolymers by the reaction of sulfur dioxide with a plurality of compounds containing olefinic unsaturation.

A further object of this invention is the provision of a process for the production of polysulfone copolymers wherein the copolymers obtained are of greater homogeneity than copolymers produced by prior methods.

Yet another object of this invention is the provision of a process for the production of high molecular weight polymeric polysulfones wherein shorter reaction times may be employed and increased yields of polymer of controlled chain length may be obtained.

Other objects of this invention will appear from the following detailed description.

The polymerization of sulfur dioxide with organic compounds having olefinic unsaturation results in the formation of polymeric polysulfone compounds which are capable of yielding commercially valuable articles when subjected to shaping operations such as, for example, molding and the like. The polymerization reaction takes place in a mol for mol ratio. One peculiarity encountered in the preparation of polymeric sulfones, in accordance with the above reaction is the fact that the reaction temperature employed plays an important role in determining whether polymerization will take place. Thus, for example, in the case of an olefin such as propylene, polysulfones will not form if the temperature at which the propylene is reacted with sulfur dioxide is above 87 to 89° C. In the case of butene-1, the ceiling temperature for polymerization with sulfur dioxide to polysulfone is about 63 to 66° C., for butene-2 about 43 to 45° C., and for isobutene about 4 to 5° C. To ensure that the desired polymerization will take place, especially when working at atmospheric pressure, it is advisable to carry out the polymerization at relatively low temperatures, and, especially, below —10° C., which is the atmospheric boiling point of sulfur dioxide. At low reaction temperatures, however, the usually used polymerization initiators like nitrate salts are rendered ineffective, because they become insoluble in sulfur dioxide and, in addition, are stable and do not produce the free radicals required to start polymerization. Other types of initiators, while soluble in liquid sulfur dioxide, are stable towards decomposition. Also, the polymerization reaction at these low temperatures is very sensitive to molecular oxygen, the presence of which inhibits polymerization completely.

We have now found that the formation of polysulfones by the polymerization of sulfur dioxide with compounds containing olefinic unsaturation may be carried out at very low temperatures to produce high yields of valuable polymeric polysulfones of a satisfactory degree of polymerization and of excellent homogeneity. Thus, in accordance with our novel process, a polymerization initiator is mixed with the olefinic compound at a temperature at which the olefinic monomer is in the liquid phase and the solution thus obtained is then gradually added to an excess of cooled, liquid sulfur dioxide while bubbling an inert gas through the liquid sulfur dioxide. Polymerization starts quite rapidly and may be noted by the fact that either the viscosity of the reaction mixture increases, the polymer formed precipitates, or both changes occur. The polymerization is usually complete shortly after the addition of the olefinic monomer. Yields of polymeric polysulfone in amounts of 90% of theoretical and more, may be obtained by our novel process and the polysulfones may be obtained with readily reproducible molecular weights.

Preferably, the liquid sulfur dioxide to which the solution of olefinic compound and initiator is added is cooled to below —10° C. and preferably to a temperature of from about —20 to —60° C., with the most advantageous results being obtained when temperatures of —30 to —50° C. are employed. Since a substantial excess of cooled sulfur dioxide is preferably employed, the reaction temperature remains within the desired range during the polymerization reaction. The sulfur dioxide may be employed in amounts of from 5 to 20 mols for each mol of olefinic compound which is reacted with the sulfur dioxide to form said polymeric polysulfones.

As polymerization initiators which are suitable for use in our process for the production of said polymeric polysulfones there may be mentioned α,α-dimethylbenzyl hydroperoxide, tertiary butyl hydroperoxide, tertiarybutyl isopropylbenzene hydroperoxide, and other hydroperoxides. The catalyst concentration in the reaction mixture may be from 0.10 to 2% by weight on the total weight of the olefinic monomers employed in carrying out said polymerization.

We have also found that when carrying out the polymerization with our novel process, the amount of initiator has a direct relation not only to the chain length of the copolymer obtained, as indicated, for example, by the measurement of the intrinsic viscosity of a solution of the polymer, but also its method of addition determines the yield of polymer. This is based on the fact that the initiators employed in the process are unstable in liquid sulfur dioxide. The solvent, sulfur dioxide, or a trace of water present and forming sulfurous acid, act as reducing activators of the hydroperoxide, decomposing it immediately with free radical formation. These latter are then available as polymerization initiators during the short period of their existence. Thus, chain initiation can occur only over a very short time period, and yield and polymer composition may depend on the method of introduction of the initiator to the polymerization system. Thus, the addition of initiator to the solution of the monomers in sulfur dioxide gives only poor yields of polymer, while, surprisingly, the simultaneous addition of initiator dissolved in olefin gives good yields and controllable molecular weights and compositions.

Another important step in our polymerization process lies in the removal of oxygen in the reaction mixture by bubbling nitrogen or other inert gas through the reaction mixture. This step of bubbling inert gas through the reactants enables the oxygen to be removed while carrying out the polymerization under normal atmospheric pressure. This simplified method of ensuring the removal of oxygen is a substantial improvement over the method heretofore employed wherein the oxygen was usually removed by maintaining the reaction mixture containing the sulfur dioxide under reflux, which step necessitated maintaining the reaction system at about —10° C. and required a condensing system to avoid the loss of the reactants.

As examples of olefins and compounds containing olefinic unsaturation which we may employ in the formation of desirable polymeric polysulfones, there may be mentioned methallyl alcohol, allyl chloride, butene-2, isobutylene, allyl alcohol, propylene, butene-1, pentene-1, cyclohexene, pentene-2 and vinyl chloride. These olefinic compounds may be employed alone or in admixture with each other when reacted with sulfur dioxide. We have also found that when isobutylene is employed in the production of polymeric polysulfones it is most advantageously employed in admixture with another olefinic compound since more favorable and wider solubility characteristics are realized in the copolymeric polysulfone compounds thus obtained in contrast to the unmodified isobutylene polysulfone.

In order further to illustrate our invention, but without being limited thereto, the following examples are given:

Example I 10 mols of sulfur dioxide are cooled to —35° C. and purified nitrogen is then bubbled through the cooled liquid. While continuing the passage of nitrogen there is then added to the sulfur dioxide a total of 1 mol of a mixture containing 20 mol percent of isobutylene and 80 mol percent of allyl chloride and containing 1% of $\alpha,\alpha$-dimethylbenzyl hydroperoxide on the weight of the combined sulfur dioxide, isobutylene and allyl chloride. The mixed catalyst and olefine solution is cooled to —35° C. The olefinic mixture is added over the course of about 50 minutes and during this time the nitrogen is bubbled through the sulfur dioxide. Further agitation is effected by stirring. The average temperature of reaction is maintained at —35° C. during the addition of the mixture of catalyst and olefinic compounds. After the addition is completed, stirring is continued for 15 minutes and the resulting polymeric polysulfone filtered from the unreacted sulfur dioxide. The isobutylene-allyl chloride polysulfone thus obtained contains 90 mol percent of isobutylene and 10 mol percent of allyl chloride, on the basis of the olefinic compounds alone, is soluble in sulfuric acid, and has a melting point of 190° C. The sulfur dioxide constitutes 50 mol percent of the total components therein. The olefin content distribution of the polysulfone may be varied by varying the mol percent of isobutylene in the mixture of olefins. Employing 10 mol percent of isobutylene and the remainder allyl chloride and utilizing the same reaction conditions yields a polysulfone copolymer containing 58 mol percent of isobutylene and 42 mol percent of allyl chloride. An increase to 15 mol percent of isobutylene in the olefin mixture yields a polysulfone copolymer containing 83 mol percent of isobutylene and 17 mol percent of allyl chloride.

Example II 8 mols of sulfur dioxide are cooled to a temperature of —30° C. and to the cooled sulfur dioxide are slowly added over the course of 40 minutes a total of 2 mols of a mixture of isobutylene and methallyl alcohol which contains 49 mol percent of isobutylene, 51 mol percent of methallyl alcohol and also 0.5% by weight of $\alpha,\alpha$-dimethylbenzyl hydroperoxide on the combined weight of the olefins and sulfur dioxide. The copolymerization is carried out with stirring at an average temperature of —30° C. while bubbling nitrogen through the reactants. After the addition of the olefins has been completed, stirring is continued for an additional 15 minutes. The precipitated isobutylene-methallyl alcohol polysulfone obtained contains 46 mol percent of isobutylene and 54 mol percent of methallyl alcohol on the basis of the olefinic portion of the polysulfone copolymer. The copolymer is soluble in sulfuric acid and has a melting point of 160° C. The composition of the isobutylene-methallyl alcohol polysulfone may be modified by changing the composition of the olefin mixture introduced into the cooled sulfur dioxide. By increasing the mol percent of isobutylene in the olefin portion of the reaction mixture to 70 mol percent, the mol percent of isobutylene in the isobutylene-methallyl alcohol polysulfone copolymer rises to 83%. An increase of the amount of isobutylene in the reaction mixture to 80 mol percent yields a copolymer containing about 96 mol percent of isobutylene. In the latter instance, the isobutylene-methallyl alcohol polysulfone copolymer no longer retains its solubility in sulfuric acid.

Example III 10 mols of sulfur dioxide are cooled to a temperature of —40° C. and to the cooled sulfur dioxide is slowly added, with stirring, a mixture of isobutylene and butene-2 containing 50 mol percent each of isobutylene and butene-2 and also 0.5% by weight of $\alpha,\alpha$-dimethylbenzyl hydroperoxide based on the weight of the total monomers. Stirring is continued after the addition is completed with the average temperature of reaction being maintained at —40° C. The polysulfone copolymer formed precipitates from the reaction mixture and is separated by filtration. The isobutylene-butene-2 polysulfone copolymer obtained contains 84 mol percent of isobutylene based on the olefinic content. The copolymer melts at a temperature of 190° C. and is soluble in sulfuric acid.

Example IV 15 mols of sulfur dioxide are cooled to a temperature of —35° C. and to the cooled sulfur dioxide are slowly added over the course of 35 minutes a total of two mols of a mixture of butene-2 and methallyl alcohol which contains 85 mol percent of butene-2, 15 mol percent of methallyl alcohol and also 0.5% by weight $\alpha,\alpha$-dimethylbenzyl hydroperoxide on the combined weight of the olefins and sulfur dioxide. The mixed catalyst and olefin solution is cooled to —35° C. The copolymerization is carried out with stirring at an average temperature of —35° C. while bubbling nitrogen through the reactants. After the addition of olefins has been completed, stirring is continued for an additional 30 minutes. The precipitated butene-2-methallyl alcohol polysulfone obtained contains 63 mol percent of butene-2 and 37 mol percent of methallyl alcohol on the basis of the olefinic portion of the polysulfone copolymer, and is soluble in sulfuric acid and tetramethylene oxide. Employing 10 mol percent of methallyl alcohol and the remainder butene-2 and utilizing the same reaction conditions yields a polysulfone copolymer containing 29 mol percent of methallyl alcohol and 71 mol percent of butene-2.

Example V 15 moles of sulfur dioxide are cooled to —30° C. and purified nitrogen is then bubbled through the cooled liquid. A total of two mols of a mixture containing 80 mol percent of methallyl alcohol and 20 mol percent of allyl chloride, in which is dissolved 0.5% $\alpha,\alpha$-dimethylbenzyl hydroperoxide, is added. Mixed catalyst and olefin mixture is added over a period of 45 minutes and the average temperature of reaction is maintained at —35° C. During the course of the reaction, the solution becomes increasingly viscous. Stirring is continued for 30 minutes after the addition is completed and the precipitated polymer is filtered from the sulfur dioxide solution. The methallyl alcohol-allyl chloride polysulfone thus obtained contains 97 mol percent of methallyl alcohol and 3 mol percent of allyl chloride. It is soluble in sulfuric acid.

Example VI 20 mols of sulfur dioxide are cooled to —30° C. and 1 mol of methallyl alcohol in which is dissolved 1% tertiary butyl hydroperoxide is added over a period of 20 minutes, during which time the solution becomes increasingly viscous. Copolymerization is carried out with stirring at an average temperature of —30° C. while bubbling nitrogen through the reactants. After the addition is completed, stirring is continued for an additional 20 minutes. The copolymer obtained is soluble in sulfuric acid and has a melting point of 165° C.

Example VII 20 mols SO$_2$ are cooled to —35° C. and 1 mol of methallyl alcohol in which is dissolved 0.5% tertiary-butyl isopropyl benzene hydroperoxide is added over a period of 20 minutes, during which time the solution becomes increasingly viscous. Copolymerization is carried out at —35° C. and nitrogen is bubbled through the reactants. After the addition is completed, stirring is continued for an additional 20 minutes. A copolymer is obtained.

It is to be understood that the foregoing detailed description is given merely by way of illustration and that many variations may be made therein without departing from the spirit of our invention.

Having described our invention, what we desire to secure by Letters Patent is:

1. In a process for the production of polymeric polysulfones, the steps which comprise adding to an olefinic compound copolymerizable with sulfur dioxide an organic hydroperoxide polymerization initiator selected from the group consisting of $\alpha,\alpha$-dimethylbenzyl hydroperoxide, tertiary butyl hydroperoxide and tertiary butyl isopropyl-benzene hydroperoxide, and then adding said mixture to an excess of cooled liquid sulfur dioxide while bubbling an inert gas through the latter to effect the copolymerization, the temperature of the reaction mixture being sufficiently low so that it remains in the liquid state during the reaction, and the organic hydroperoxide being capable of initiating the polymerization at the temperature of the reaction mixture.

2. In a process for the production of polymeric polysulfones, the steps which comprise adding to an olefinic compound copolymerizable with sulfur dioxide an organic hydroperoxide polymerization initiator selected from the group consisting of α,α-dimethylbenzyl hydroperoxide, tertiary butyl hydroperoxide and tertiary butyl isopropylbenzene hydroperoxide, and then adding said mixture to an excess of cooled liquid sulfur dioxide while bubbling an inert gas through the latter to effect the copolymerization, there being employed from 5 to 20 mols of sulfur dioxide for each mol of olefinic compound, the temperature of the reaction mixture being sufficiently low so that it remains in the liquid state during the reaction, and the organic hydroperoxide being capable of initiating the polymerization at the temperature of the reaction mixture.

3. In a process for the production of polymeric polysulfones, the steps which comprise adding to a plurality of olefinic compounds copolymerizable with sulfur dioxide an organic hydroperoxide polymerization initiator selected from the group consisting of α,α-dimethylbenzyl hydroperoxide, tertiary butyl hydroperoxide and tertiary butyl isopropylbenzene hydroperoxide, and then adding said mixture to an excess of cooled liquid sulfur dioxide while bubbling an inert gas through the latter to effect the copolymerization, the temperature of the reaction mixture being sufficiently low so that it remains in the liquid state during the reaction, and the organic hydroperoxide being capable of initiating the polymerization at the temperature of the reaction mixture.

4. In a process for the production of polymeric polysulfones, the steps which comprise adding to an olefinic compound copolymerizable with sulfur dioxide an organic hydroperoxide polymerization initiator selected from the group consisting of α,α-dimethylbenzyl hydroperoxide, tertiary butyl hydroperoxide and tertiary butyl isopropylbenzene hydroperoxide, said initiator being employed in an amount of 0.10 to 2.0% on the weight of the total monomers, and then adding said mixture to an excess of cooled liquid sulfur dioxide while bubbling an inert gas through the latter to effect the copolymerization, the temperature of the reaction mixture being sufficiently low so that it remains in the liquid state during the reaction, and the organic hydroperoxide being capable of initiating the polymerization at the temperature of the reaction mixture.

5. In a process for the production of polymeric polysulfones, the steps which comprise adding to a plurality of olefinic compounds copolymerizable with sulfur dioxide an organic hydroperoxide polymerization initiator selected from the group consisting of α,α-dimethylbenzyl hydroperoxide, tertiary butyl hydroperoxide and tertiary butyl isopropylbenzene hydroperoxide, said initiator being employed in an amount of 0.10 to 2.0% on the weight of the total monomers, and then adding said mixture to an excess of cooled liquid sulfur dioxide while bubbling an inert gas through the latter to effect the copolymerization, there being employed from 5 to 20 mols of sulfur dioxide for each mol of olefinic compound, the temperature of the reaction mixture being sufficiently low so that it remains in the liquid state during the reaction, and the organic hydroperoxide being capable of initiating the polymerization at the temperature of the reaction mixture.

6. In a process for the production of polymeric polysulfones, the steps which comprise adding to a mixture of isobutylene and other olefinic compound copolymerizable with sulfur dioxide selected from the group consisting of allyl chloride, methallyl alcohol and butene-2, an organic hydroperoxide polymerization initiator selected from the group consisting of α,α-dimethylbenzyl hydroperoxide, tertiary butyl hydroperoxide and tertiary butyl isopropylbenzene hydroperoxide and then adding said mixture to an excess of cooled liquid sulfur dioxide while bubbling an inert gas through the latter to effect the copolymerization, the temperature of the reaction mixture being sufficiently low so that it remains in the liquid state during the reaction, and the organic hydroperoxide being capable of initiating the polymerization at the temperature of the reaction.

7. In a process for the production of polymeric polysulfones, the steps which comprise adding to a mixture of butene-2 and methallyl alcohol an organic hydroperoxide polymerization initiator selected from the group consisting of α,α-dimethylbenzyl hydroperoxide, tertiary butyl hydroperoxide and tertiary butyl isopropylbenzene hydroperoxide and then adding said mixture to an excess of cooled liquid sulfur dioxide while bubbling an inert gas through the latter to effect the copolymerization, the temperature of the reaction mixture being sufficiently low so that it remains in the liquid state during the reaction, and the organic hydroperoxide being capable of initiating the polymerization at the temperature of the reaction mixture.

8. In a process for the production of polymeric polysulfones, the steps which comprise adding to a mixture of allyl chloride and methallyl alcohol an organic hydroperoxide polymerization initiator selected from the group consisting of α,α-dimethylbenzyl hydroperoxide, tertiary butyl hydroperoxide and tertiary butyl isopropylbenzene hydroperoxide and then adding said mixture to an excess of cooled liquid sulfur dioxide while bubbling an inert gas through the latter to effect the copolymerization, the temperature of the reaction mixture being sufficiently low so that it remains in the liquid state during the reaction, and the organic hydroperoxide being capable of initiating the polymerization at the temperature of the reaction mixture.

References Cited in the file of this patent

UNITED STATES PATENTS

| Number | Name | Date |
|---|---|---|
| 2,505,833 | Noether | May 2, 1950 |
| 2,645,631 | Crouch et al. | July 13, 1953 |